United States Patent [19]

Thurnauer et al.

[11] 3,904,352
[45] Sept. 9, 1975

[54] ASSEMBLY AND METHOD FOR SUPPORTING CERAMICS AND THE LIKE DURING FIRING

[75] Inventors: Hans Thurnauer, Boulder; Lawrence E. Coubrough, Golden, both of Colo.

[73] Assignee: Coors Porcelain Company, Golden, Colo.

[22] Filed: Jan. 17, 1974

[21] Appl. No.: 434,319

[52] U.S. Cl. .................. 432/5; 432/245; 432/259; 264/58
[51] Int. Cl.² .......................................... F27D 5/00
[58] Field of Search .......... 432/259, 258, 253, 251, 432/252, 245, 5, 87; 122/510; 165/67, 68, 165/81, 82; 248/19, DIG. 1; 269/289, 321 ME; 264/57–59

[56] References Cited
UNITED STATES PATENTS

| | | | |
|---|---|---|---|
| 1,342,041 | 6/1920 | Drinker | 432/245 |
| 1,634,084 | 6/1927 | Ruths | 122/510 |
| 1,917,964 | 7/1933 | Fuschi et al. | 264/58 |
| 1,986,668 | 1/1935 | Maxwell | 122/510 |
| 2,201,786 | 5/1940 | Nilson | 122/510 |
| 3,179,724 | 4/1965 | Jones | 264/58 |
| 3,190,173 | 6/1965 | Pettavel | 248/19 |
| 3,413,960 | 12/1968 | Feliks et al. | 122/510 |

FOREIGN PATENTS OR APPLICATIONS

| | | | |
|---|---|---|---|
| 1,143,151 | 9/1957 | France | 432/259 |
| 795,014 | 5/1958 | United Kingdom | 264/57 |

*Primary Examiner*—John J. Camby
*Assistant Examiner*—Henry C. Yuen
*Attorney, Agent, or Firm*—Reising, Ethington, Barnard, Perry and Brooks

[57] ABSTRACT

In accordance with the invention a ceramic article is supported, during firing, by rollable bodies of high heat resistant material so that as shrinkage occurs in the ceramic article during firing there is no frictional drag between the article and its support.

20 Claims, 5 Drawing Figures

ASSEMBLY AND METHOD FOR SUPPORTING CERAMICS AND THE LIKE DURING FIRING

This invention relates to a method and apparatus for supporting ceramic articles during firing so as to inhibit distortion of the ceramic article which otherwise occurs during firing.

Most ceramics, and particularly industrial ceramics, undergo considerable shrinkage as they are fired. Typical are ceramic bodies formed of aluminum oxide base ceramic, mullite, cordierite and the like. Conventional practice in the manufacture of such ceramic bodies is to first form a batch consisting of the ceramic ingredient or ingredients, in powder form, plus an organic binder such as a wax or any of a number of organic resins. This batch is then shaped into the article of the shape desired but of larger dimensions than those desired for the final article such that after the predictable amount of shrinkage which occurs in the subsequent firing operation, the final fired article will be of both the shape and the size desired. In the firing operation, during which the temperature is raised to the sintering or vitrification temperature (hereinafter the term "sintering" will, for simplicity, be used to mean either sintering or vitrification, whichever is appropriate to the particular ceramic composition being fired) of the ceramic, there is significant shrinkage by reason of the burn-out or gasification of the organic binder and also by reason of the shrinkage inherent to the sintering and resulting densification of the ceramic. Even with ceramic processing techniques wherein no organic binder is used, there generally occurs, nevertheless, significant densification of the ceramic during sintering and hence significant shrinkage.

For most ceramic articles, and particularly for those of small size, the shrinkage which occurs during firing creates no serious problem in the way of distortion of the ceramic article during the firing operation. Conventional practice is to simply set the unfired ceramic ware on the flat surfaces of refractory setters which support the ceramic ware in the kiln during the firing operation. However, where the ceramic article being fired is of relatively large size, and particularly where the article is not only relatively large but is also of a shape having thin sections, there can be a serious distortion problem during firing. When distortion of the ceramic article does occur during firing it is conventionally considered to stem from, and often does stem from, non-uniformity of composition in the pre-fired article — for example, a higher concentration of organic binder in one portion of the article than in another. However, we have found that particularly where the article is large, and most particularly where it is not only large but has thin sections, a major cause of distortion is the inhibition to movement of the article relative to its support during firing. That is, with the ceramic article resting on the support surface, the required relative movement of the article with respect to the support surface, inherent to the shrinkage, is inhibited by frictional drag between the article and its support. This results in distortion of the article during the firing operation.

The particular ceramic article the firing of which resulted in such serious distortion as to create the necessity for a solution to the problem was a ceramic heat exchanger disc approximately 4 inches in axial thickness and with a diameter of about 18 inches, the entire article consisting of thin walls defining contiguous axially extending passages through the disc. In other words, the article was not only large but it was also relatively fragile and highly subject to distortion during firing. Distortion resulted in curvature being imparted to the axially extending passages, particularly those passages toward the outer periphery. The immediate problem with which we were confronted, therefore, was that of firing such heat exchanger discs in such manner as to eliminate the distortion.

Fundamental to the solution, in accordance with the present invention, is the use of heat-resistant bodies between the article being fired and a support surface, which bodies are rollable on the support surface, and with respect to the ceramic article, in the direction of at least one component of the direction of shrinkage of the ceramic article during firing. Further in accordance with the present invention, the ideal rollable bodies are spheres which can, therefore, roll in all directions and hence in the precise direction of the shrinkage. Still further in accordance with the preferred embodiment of the invention, the ceramic article is supported during firing by a plurality of spaced heat resistant plates, and one or more, preferably at least three, of the heat resistant spheres are positioned between each of these plates and the support surface. Still further in accordance with the preferred embodiments of the invention, the spheres are initially, prior to the firing operation, bonded to the plates by a bonding material, such as an organic resin, which melts, vaporizes or burns away, i.e., which is destroyed, thereby to cease functioning as a bonding material, at a temperature no greater than that at which the shrinkage of the ceramic article commences. This greatly facilitates assembly of the combination of the spheres and plates relative to the ceramic article to be fired. In accordance with the most preferred embodiment of the invention, to maximize ease of assembly, all of the heat resistant spheres are bonded, by means of an ephemeral bonding material, such as an organic resin as aforesaid, to the support surface or, alternatively, the plates are ephemerally bonded to each other. In accordance with another feature of the invention, the support surface for these spheres has a generally concave shape so as to induce the spheres to roll in the direction of the shrinkage as the shrinkage occurs.

The above and other features of the invention will appear more clearly from the following detailed description of preferred embodiments of the invention made with reference to the accompanying drawings wherein.

Figure 1:
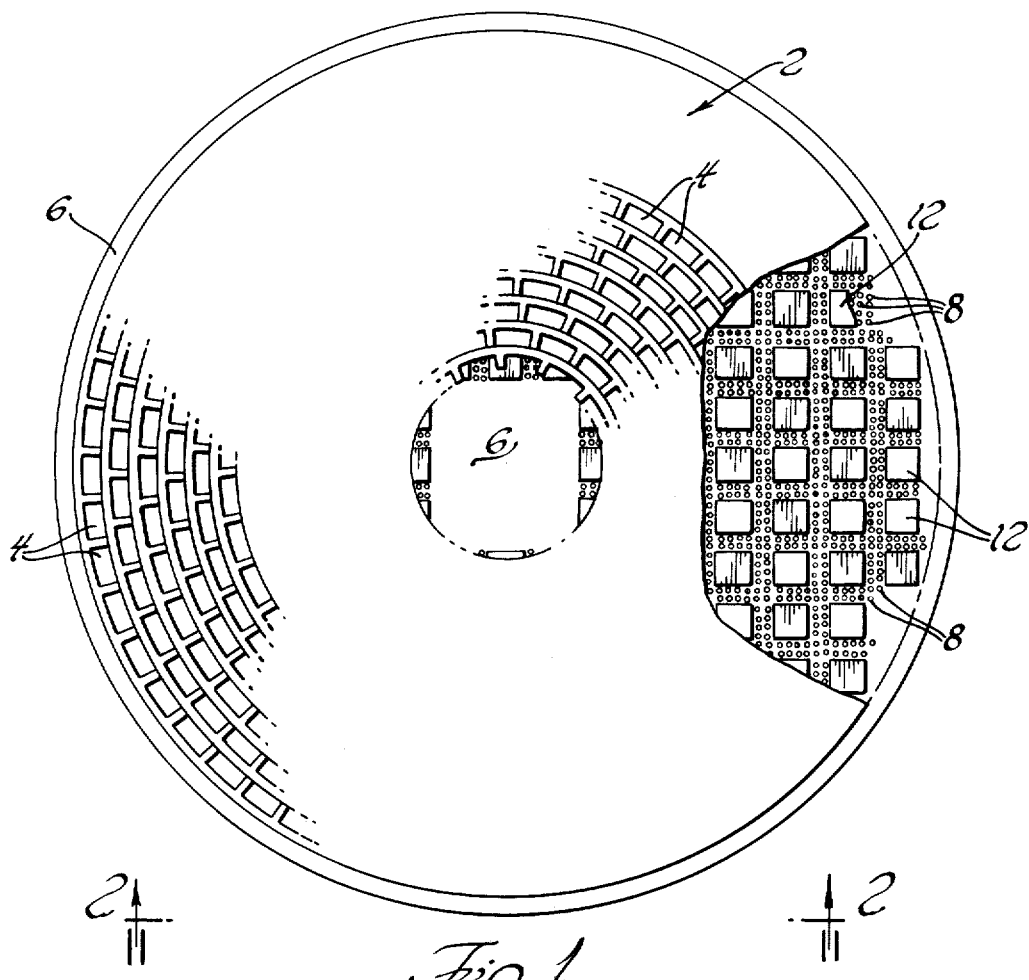
FIG. 1 is a top view, with parts broken away, of a ceramic article to be fired resting on a setter assembly made in accordance with the invention.
Figure 2:
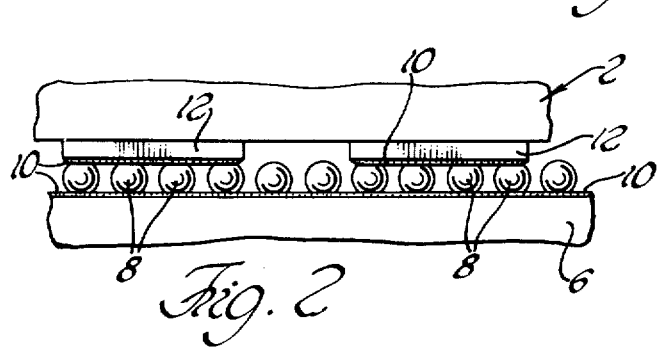
FIG. 2 is a partial side view, but in enlarged scale, taken on the line 2—2 of FIG. 1.
Figure 3:
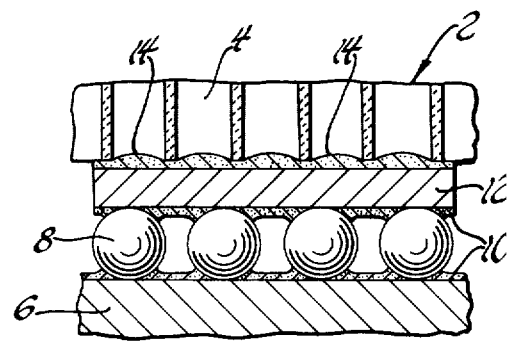
FIG. 3 is a view similar to that of FIG. 2 but in section and of still further enlarged scale.

Referring now to FIGS. 1 and 2, there is shown a ceramic article 2 ready for the firing operation and resting on a setter assembly constructed in accordance with the invention. The ceramic article 2, which is of annular shape, is formed of a mixture of ceramic powder and organic resin binder and has a honeycomb structure providing passages 4 therethrough. (For simplicity in the drawing these passages 4 and the wall structure providing same are only shown for a portion of the top surface of the article.) The setter assembly comprises a refractory support member 6 having a smooth flat upper surface with a plurality of small heat resistant spheres 8 resting thereon and ephemerally bonded thereto by bonding material 10. A plurality of laterally spaced heat-resistant square plates 12 are placed over the tops of the spheres, each plate being ephemerally bonded by bonding material 10 to the spheres on which it rests. FIG. 3 shows a sectional view, in much enlarged scale, of one of the plates 12 with its associated spheres 8 bonded to the support surface 6, and with the article to be fired, 2, resting on the plates.

The bonding material 10 bonding the spheres to the heat resistant plates and to the support surface is an organic resin or other bonding material the melting temperature or the burn-out or vaporization temperature of which is no greater than the temperature at which shrinkage commences in the article to be fired during the firing operation. Where the article to be fired includes a vaporizable or burnable organic resin or other binder, shrinkage of the ceramic article during firing only commences upon the commencement of the vaporization or burn-out of the binder, and hence it is satisfactory to use as the bonding material for the setter assembly an organic resin or other organic material the same as that used as the binder for the ceramic article being fired, or some other organic resin or other material which melts, vaporizes or burns out at a temperature lower than that at which the vaporization or burn-out of the binder in the ceramic article commences. For example, if the binder used in the ceramic article consists of polyvinyl butyral, then this same organic resin can be used as the bonding material for the setter assembly, or, alternatively, an organic wax, such as paraffin wax, or some other organic resin, such as cellulose acetate, having a melting temperature or a vaporization or burn-out temperature lower than that of polyvinyl butyral can be used as the bonding material for the setter.

The support surface 6, plates 12 and spheres 8 should, of course, have sufficient heat resistance to withstand the firing temperature without softening or other deterioration. It is satisfactory to use as a material for the heat resistant plates and spheres, for example, the same ceramic as that of the ceramic article being manufactured, or a ceramic having a greater heat resistance than that of the ceramic article being manufactured. To illustrate, if the ceramic article being fired is of alumina ceramic or cordierite or mullite, then it is satisfactory that the plates and spheres be of sintered alumina.

It is preferred that the plates be secured against movement relative to the article by means of a layer of refractory powder 14 as shown in FIG. 3 as will be discussed further hereinafter.

The total assembly as shown and described is placed or conducted into the kiln for the firing operation and during the early stages of this firing operation the bonding material of the setter assembly melts, vaporizes or burns away, thereby leaving the spheres free to roll on the refractory support surface and also on or with respect to the plates. Also, with the bonding material gone, the plates are free to move with respect to each other. Simultaneously or subsequently during the firing operation, shrinkage of the ceramic article being fired commences. The shrinkage is in a radially inward direction, and since each of the plates remains stationary relative to the ceramic article being fired, the ceramic plates, during the period that the shrinkage occurs, move with respect to each other in the same radially inward direction as that of the shrinkage. During this movement of the plates with respect to each other, the spheres supporting each plate roll on the refractory surface and also on or with respect to the plates. The support surface and the plates should preferably be very smooth so as not to inhibit the rolling of the spheres. It will be manifest that the initial spacing of the plate 4 should be such that there is room for them to move toward each other during the firing without coming into abutting relationship at least prior to completion of the shrinkage. As the plates move toward each other during the firing, if, as will generally be the case, the plates move out of contact with any of the spheres initially supporting same, they move into contact with other of the spheres for support thereby. In this regard it will be noted from FIG. 1 that the spheres are preferably put down onto the support surface in a regular pattern whereby they are substantially equally spaced from each other, and with many of the spheres being between rather than under the plates. This can easily be accomplished by coating the support surface with a tacky organic bonding material, having the characteristics as aforesaid, placing over but slightly spaced from the surface a template having openings therein only slightly larger than the spheres, and with the configuration or spacing of the openings being that desired for the spheres, placing the spheres in the openings and against the tacky layer of bonding material, and then removing the template. Then the bottom surfaces of the plates are provided with a layer of the bonding material and are placed over and against the tops of the spheres.

To provide maximum support for the article being fired, it is desirable to calculate the amount of initial spacing which is essential between the plates to enable them to move toward each other during the firing and then space the plates accordingly or with perhaps a small additional amount of spacing to better assure the plates will not come into contact with each other prior to completion of the shrinkage. Such calculation can easily be made on the basis of the amount of shrinkage which the article will undergo during firing.

For the firing of a round article, as is true of the one shown, it is at least theoretically desirable that the plates be not rectangular but instead of arcuate shape and with the placement of such plates being such that their curvature is concentric with the curvature of the periphery of the article — this to further eliminate nonessential initial spacing and thereby provide maximum support area for the article. However, as a practical matter this generally is not necessary since there can be a substantial amount of non-essential initial spacing between the plates without hazard of the article being fired sagging, during firing, between the plates.

Figure 4:
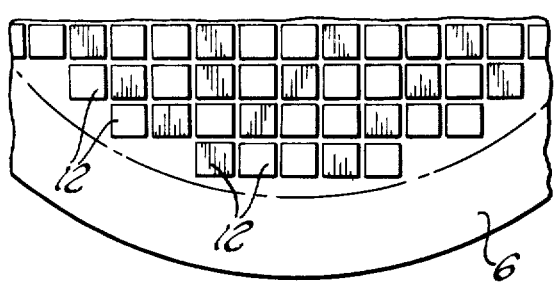
FIG. 4 is a view similar to that of FIG. 1, but in less detail, showing the setter assembly upon completion of the firing operation.

FIG. 4 shows the assembly of plates 12 upon completion of the firing operation. The shrinkage of the article which has been fired has caused a reduction in the spacing between the plates, as shown, the plates having moved radially inward with the shrinkage and closer to each other.

Figure 5:
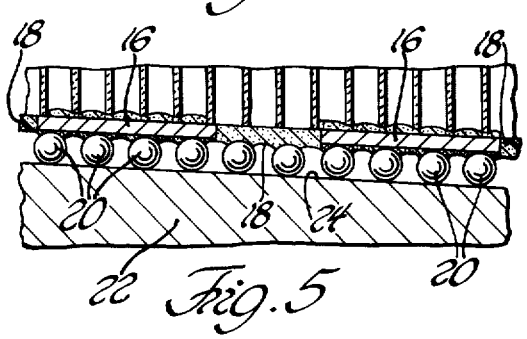
FIG. 5 is a view similar to that of FIG. 3 but showing another embodiment of the invention.

The embodiment shown in FIG. 5 is the same as that shown in FIGS. 1–3 except in two respects.

First, the heat resistant plates 16 are initially ephemerally bonded to each other by a bonding material 18 like that previously described, but the spheres 20 are not initially bonded to the surface of the support member 22. This feature of bonding the plates together alternatively or in addition to bonding the spheres to the support surface can, of course, be used in the FIG. 1–3 embodiment if desired, or the feature of the FIG. 1–3 embodiment of bonding the spheres to the support surface can be used in the FIG. 5 embodiment alternatively or in addition to bonding the plates together.

Secondly, in the FIG. 5 embodiment the setter assembly, with the ceramic article to be fired resting thereon, is placed in a shallow concave depression in the surface of the support member 22, a portion of this depression (on the right hand side of the depression as the portion is shown on the drawings), being shown at 24. The setter assembly on which the ceramic article rests and the bottom surface of the article to be fired are of like shape (but with convex curvature) such that they nest together. The convex shape can be imparted to the bottom surface of the article to be fired by a machining operation.

The advantage to the FIG. 5 embodiment is that by reason of the concave depression in the support member the spheres are induced to roll in the direction of the shrinkage thereby even further diminishing the possibility of drag on the bottom of the article during shrinkage and hence the possibility of distortion. It should be pointed out that merely for purposes of illustrating this embodiment of the invention, the radially inward slope of the support surface and setter assembly shown in FIG. 5 is steeper than it need be. That is, only a very slight slope, and hence very shallow concavity, is necessary, and indeed desirable, to induce the spheres to roll radially inwardly. During the firing and during the shrinkage, the operation of the setter assembly is the same as described in conjunction with FIGS. 1–4 except that in this FIG. 5 embodiment the radially inwardly sloped surfaces of the support induce the spheres to roll radially inwardly, and hence in the direction of the shrinkage, as described above.

Though the FIG. 5 embodiment does have the aforesaid advantage it has a disadvantage if the structure and material of the ceramic article, after firing, is such that it is difficult to machine and if there is a requirement that the ceramic article have flat bottom and top surfaces. Of course, this is because in order to accomplish the finished end product having flat top and bottom surfaces it is necessary to machine to a flat shape the generally convex bottom surface which results from the practice of this embodiment. However, for ceramic articles like the heat exchanger disc of honeycomb structure which has been described, machining of the end surface presents no problem.

The concave depression can be of generally spherical curvature or it can be conical or pyramidal. Even where the depression is of compound curvature or conical the refractory plates can be flat so long as they are sufficiently small that the edges or corners thereof do not make contact with the concave support surface. Since, as indicated above, only a very shallow concavity is necessary this presents no problem.

Reference is now again made to a feature shown in FIGS. 3 and 5, which can serve to advantage in the practice of the invention, namely, the powder 14 on the tops of the plates. The purpose of the heat resistant powder 14 is to further inhibit movement of the plates relative to the ceramic article during shrinkage, (except for the very slight movement of that area of the ceramic article in contact with the plate inherently caused by the shrinkage of that area of the ceramic article.) The refractory powder can be easily applied to the plates of the setter assembly simply by coating their upper surfaces with a rather thick aqueous slurry of the powder. When the ceramic article having the honeycomb structure is placed on the setter assembly, it sinks into the powder as shown thereby better assuring against movement of the plates relative to the article. The powder used should preferably have a higher sintering temperature than that of the ceramic being fired such that the powder does not bond to the ceramic article during firing. Alumina powder is excellent in practically all cases since even where alumina ceramic (which has a sintering temperature higher than that of most other ceramics) is being manufactured the particular ceramic formulation used will generally include at least small amounts of ingredients which reduce the sintering temperature from that of 100% alumina.

It will be understood that various changes and modifications may be made, the following being illustrative.

Though spheres are much preferred as the rollable elements, cylindrical elements can be used particularly where the shape of the body being fired is predominantly along only one axis, as, for example, would be the case for a rod-shaped ceramic article having a length great in comparison to its width.

Though it is of great advantage to ephemerally bond the spheres to the heat resistant plates as shown and described and to either ephemerally bond the heat resistant plates together or to ephemerally bond the spheres to the support surface, these features are not essential to the practice of the invention in its broader scope. For example, the joining of the heat resistant plates, with their associated spheres, by the ephemeral bonding material and the bonding of the spheres to the support surface can be eliminated and the heat resistant plates, each with its associated sphere or spheres bonded thereto, can be placed down individually on the refractory surface in the desired spaced pattern and then the ceramic article to be fired placed thereover. Further, though the ephemeral bonding of the spheres to the heat resistant plates is especially advantageous in order to facilitate assembly of the plates and spheres to the ceramic article, such is not essential to the practice of the invention in its broadest scope.

Still further, though generally disadvantageous for the reasons which will hereinafter be mentioned, it is within the purview of the invention, in its broadest scope, to place the article to be fired directly into contact with the spheres or other rollable elements which, in turn, are supported on and rollable with respect to a support surface. This is generally disadvantageous, however, because the rollable elements provide only point, or at best line, contact with the article being fired, and hence with the hazard of resulting indentations in the article at the conclusion of the firing operation. Further, in the case where the article being fired has thin sections, or a non-continuous bottom surface (as is true of the honeycomb structure shown) it is generally impractical to support the article directly by the rollable elements. These problems can be reduced by using rollable elements of relatively large size; however, this is space consuming, increases the cost of the setter assembly, and, except where the FIG. 5 embodiment is used, results in increased resistance of the rollable elements to roll with respect to the support because of the relatively large weight attendant to the large size of the elements. For the practice of the invention, particularly the preferred embodiments thereof as described, it is generally preferable to use rollable elements, ideally spheres, having a diameter not greater than about one-quarter inch, and most preferably not greater than about one-eighth inch. The spheres should preferably be of smooth surface as also should be the support surface and the surfaces of the plates in contact with the spheres — this to minimize friction against rolling. Indeed, tungsten carbide or alumina ceramic balls of the size conventionally used as the ball elements for ball-point pens can serve well as the rollable elements for the practice of the preferred embodiments of the invention wherein the article to be fired is supported on small refractory plates and with the rollable elements being located between these refractory plates and refractory support surface. It should be mentioned, however, that the use of larger rollable elements is advantageous in situations where the support surface is not smooth or where there is a problem of kiln dust settling on the support surface such as to inhibit the rolling of smaller rollable elements.

Other changes and modifications can be made within the full and intended scope of the claims which follow.

The embodiments of the invention in which an exclusive property or privilege is claimed are defined as follows:

1. A setter assembly for supporting, during firing, an article of sinterable powder material which shrinks during the firing, said setter assembly comprising a plurality of spaced refractory plates each having an upper surface for supporting said article during the firing, and at least one refractory rollable element bonded to the bottom surface of each of the plates by a bonding material which is destroyed at a temperature below that at which shrinkage commences in the article being fired whereby when said shrinkage commences said plates cease to be bonded to said rollable elements.

2. A setter assembly as set forth in claim 1 wherein the refractory plates are held together by a bonding material which is destroyed at a temperature below that at which shrinkage commences in the article being fired whereby when said shrinkage commences said plates are no longer bonded to each other and are thereby free to move relative to each other.

3. A setter assembly as set forth in claim 1 wherein each of the refractory plates has at least three of the refractory rollable elements bonded to the bottom surface thereof.

4. A setter assembly as set forth in claim 1 wherein the rollable elements are spheres.

5. A setter assembly as set forth in claim 4 wherein the spheres have a diameter no greater than about 1/4 inch.

6. A setter assembly as set forth in claim 1 wherein the refractory plates have deposited thereon refractory powder against which the article being fired rests.

7. A setter assembly for supporting, during firing, an article of sinterable powder material which shrinks during the firing, said setter assembly comprising a refractory support surface, a plurality of laterally spaced refractory plates each having an upper surface for supporting the article to be fired, and at least one refractory rollable element between each of said plates and said support surface.

8. A setter assembly as set forth in claim 7 wherein the rollable elements are bonded to the support surface by a bonding material which is destroyed at a temperature below that at which shrinkage commences in the article being fired whereby when said shrinkage commences said rollable elements cease to be bonded to said support surface.

9. A setter assembly as set forth in claim 7 wherein the plates are held together by a bonding material which is destroyed at a temperature below that at which shrinkage commences in the article being fired whereby when said shrinkage commences said plates are no longer bonded to each other and are thereby free to move relative to each other.

10. A setter assembly as set forth in claim 7 wherein the rollable elements are spheres.

11. A setter assembly as set forth in claim 10 wherein the spheres have a diameter of less than about one-quarter inch.

12. A setter assembly as set forth in claim 10 wherein the spheres are in equally spaced relationship with each other.

13. A setter assembly as set forth in claim 10 wherein each of the plates is supported by at least three of the spheres.

14. A setter assembly as set forth in claim 7 wherein the support surface is a shallow concave depression whereby after said bonding material is destroyed the rollable elements are induced by gravity to roll toward the center of the support surface.

15. A method for firing an article of sinterable powder material which shrinks during firing comprising supporting the article on a plurality of spaced refractory plates which are supported by refractory rollable elements which are in contact with a refractory support surface and which are permitted to roll with respect to the support surface during the firing, and firing the article while so supported whereby during the shrinkage of the article which occurs during the firing said rollable elements roll on said support surface.

16. A method as set forth in claim 15 wherein the rollable elements are spheres.

17. A method as set forth in claim 15 wherein the rollable elements are bonded to the support surface by a bonding material which is destroyed at a temperature below that at which shrinkage of the article commences whereby when the shrinkage commences said rollable elements cease to be bonded to said support surface.

18. A method as set forth in claim 15 wherein said rollable elements are bonded to said plates by a bonding material which is destroyed at a temperature below that at which shrinkage commences whereby when the shrinkage commences the plates cease to be bonded to said rollable elements.

19. A method as set forth in claim 15 wherein each of the plates has deposited on the upper surface thereof a refractory powder against which the article being fired rests.

20. A method as set forth in claim 15 wherein the support surface is shaped to induce, by force of gravity, the rollable elements to roll toward the center of the support surface.

* * * * *